United States Patent
Takami et al.

(10) Patent No.: US 6,350,544 B1
(45) Date of Patent: *Feb. 26, 2002

(54) LITHIUM SECONDARY BATTERY

(75) Inventors: Norio Takami; Asako Satoh; Takahisa Ohsaki, all of Yokohama (JP)

(73) Assignee: Kabushiki Kaisha Toshiba, Kawasaki (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/040,459

(22) Filed: Mar. 18, 1998

Related U.S. Application Data

(62) Division of application No. 08/755,099, filed on Nov. 22, 1996, now Pat. No. 5,753,387.

(30) Foreign Application Priority Data

Nov. 24, 1995 (JP) ............................................. 7-305960
Nov. 28, 1995 (JP) ............................................. 7-309104

(51) Int. Cl.$^7$ ............................................. H01M 4/58
(52) U.S. Cl. ............................... 429/231.4; 429/231.6; 429/231.8
(58) Field of Search .................... 429/231.4, 231.6, 429/231.8; 423/420.2, 421

(56) References Cited

U.S. PATENT DOCUMENTS

| | | |
|---|---|---|
| 4,980,250 A | 12/1990 | Takahashi et al. |
| 5,028,500 A | 7/1991 | Fong et al. |
| 5,244,757 A | 9/1993 | Takami et al. |
| 5,312,611 A | 5/1994 | Takami et al. |
| 5,340,670 A | 8/1994 | Takami et al. |

OTHER PUBLICATIONS

Tao Zheng, et al, "Effect of turbostratic disorder in graphitic carbon hosts on the intercalation of lithium", The American Physical Society, Physical Review B, (pp. 743–741), vol. 51, No. 2, Jan. 1, 1995.

J.N. Reimers, et al, "Effect of Boron, Nitrogen and Phosphorus Additions on the Intercalation of Lithium in Carbons", Industrial Chemistry Library, Lithium Batteries/New Materials, Development and Perspectives, (pp. 36–39), vol. 5, 1994. (No month available).

B. D. Cullity, "Elements of X–Ray Diffraction", 2nd Edition, Addison–Wesley Publishing, p. 351, 1978.*

J.S. Xue, et al, "Dramatic Effects of Oxidation on Lithium Insertion in Carbons Made from Epoxy Resins", J. Electrochem. Soc., (pp. 3668–3677), vol. 142, No. 11, Nov. 1995.

Tao Zheng, et al, "Lithium Insertion in High Capacity Carbonaceous Materials", J. Electrochem. Soc., (pp. 2581–2590), vol. 142, No. 8, Aug. 1995.

Aisaku Nagai, et al, "Lithium Storage Mechanism in Nongraphitizable Carbon", Mat. Res. Soc. Symp. Proc., (pp. 339–343), vol. 393, Apr. 17–20, 1995.

Akihiro Mabuchi, et al, "Charge–Discharge Characteristics of the Mesocarbon Microbeads Heat–Treated at Different Temperatures", J. Electrochem. Soc., (pp. 1041–1046), vol. 142, No. 4, Apr. 1995.

A.M. Wilson, et al, "Lithium Insertion in Carbons Containing Nanodispersed Silicon", J. Electrochem. Soc., (pp. 326–332), vol. 142, No. 2, Feb. 1995.

* cited by examiner

*Primary Examiner*—Carol Chaney
(74) *Attorney, Agent, or Firm*—Oblon, Spivak, McClelland, Maier & Neustadt, P.C.

(57) ABSTRACT

This invention provides a lithium secondary battery comprising a positive electrode, a negative electrode comprising a carbonaceous material which is capable of absorbing and desorbing lithium ions, and a nonaqueous electrolyte, wherein the carbonaceous material has a region of amorphous carbon structure and a region of graphite structure, and the carbonaceous material has a true density of 1.8 g/cm$^3$ or more and a peak in powder X-ray diffraction which corresponds to not more than 0.340 nm in an interplanar spacing $d_{002}$ derived from (002) reflection.

49 Claims, 2 Drawing Sheets

LITHIUM SECONDARY BATTERY

This appln is a Div. of Ser. No. 08/755,099 filed Nov. 22, 1996 U.S. Pat. No. 5,753,387.

BACKGROUND OF THE INVENTION

1. Field of the Invention

This invention relates to a lithium secondary battery and in particular to a lithium secondary battery having an improved negative electrode containing a carbonaceous material.

2. Description of the Related Art

In recent years, a nonaqueous electrolyte secondary battery using lithium as a negative electrode active material has been attracting attentions as a high energy density battery. Among such nonaqueous electrolyte secondary batteries, a primary battery using manganese dioxide ($MnO_2$), carbon fluoride [$(CF_2)_n$] or thionyl chloride ($SOCl_2$) as a positive electrode active material is already widely used as a power source of a timepiece or an electric calculator, or as a backup battery of a memory.

In addition, as the sizes and weights of various types of electronic equipment, such as VTR devices or communication equipments have been decreased, a demand for a secondary battery having a high energy density which can be suitably used as a power source of these equipments has been increased, and therefore, the nonaqueous electrolyte secondary battery has been actively studied.

For example, the preparation of a nonaqueous electrolyte secondary battery has been studied wherein the negative electrode thereof is constituted by lithium, an electrolyte is constituted by a nonaqueous electrolyte which can be prepared by dissolving an electrolytic salt such as $LiClO_4$, $LiBF_4$ or $LiAsF_6$ in a nonaqueous solvent such as propylene carbonate (PC), 1,2-dimethoxyethane (DME), γ-butyrolactone (γ-BL) or tetrahydrofuran (THF), or constituted by a lithium ion-conductive solid electrolyte, and a positive electrode active material is constituted by a compound which is capable of topochemically reacting with lithium such as $TiS_2$, $MoS_2$, $V_2O_5$; $V_6O_{13}$ and $MnO_2$ for instance.

However, the lithium secondary battery as mentioned above has not been put into practical use yet. This is mainly because the charge/discharge efficiency of the battery is low and the number of charge/discharge times (or cycle life) thereof is still insufficient. The cause for this poor performance is assumed to be ascribed to the fact that lithium constituting the negative electrode is degraded due to a reaction with a nonaqueous electrolyte. Namely, lithium dissolved in the nonaqueous electrolyte in the form of lithium ions during the discharging reacts with a solvent as it is precipitated at the moment of charging thereby causing the surface of lithium to be partially inactivated. Therefore, when the charge/discharge is repeated, lithium is precipitated in the form of dendrites or small spheres, or is separated from the collector.

On the other hand, the employment as a negative electrode of a lithium alloy represented by a general formula of $Li_xA$ (where A is a metal such as Al) is now studied. The negative electrode constituted by this lithium alloy is large in absorption/desorption ratio of lithium ions per unit volume of the negative electrode and hence high in capacity. However, since this negative electrode expands and shrinks as the lithium ions are absorbed therein and desorbed therefrom, the structure of the lithium alloy would be destroyed in the repetition of the absorption/desorption of lithium ions. Therefore, a lithium secondary battery provided with this negative electrode is defective in that the charge/discharge life thereof is short.

For these reasons, there has been proposed to employ, as a negative electrode for a lithium secondary battery, a carbonaceous material which is capable of absorbing or desorbing lithium ions such as coke, sintered resin, carbon fibers or pyrolytic epitaxial carbon so as to prevent the degradation in performance of a negative electrode that may be brought about by a reaction between lithium and a nonaqueous electrolyte or by the precipitation of dendrite.

It is now considered that the charge/discharge of a negative electrode comprising the aforementioned carbonaceous materials is mainly performed by the movement of lithium ions entering into or getting out of an interface between layers constituting a laminate structure of carbon planes formed of carbon atoms (a graphite structure) in the carbonaceous material. For this reason, it is required to employ, as a negative electrode for a lithium secondary battery, a carbonaceous material which is developed more or less in graphitization. However, when a carbonaceous material to be obtained by pulverizing a macro-crystal developed in graphitization is employed as a negative electrode in a nonaqueous electrolyte, the decomposition of the nonaqueous electrolyte will be caused, resulting in the deterioration of capacity and charge/discharge efficiency of the battery. Moreover, as the charge/discharge cycle is repeated, the deterioration of capacity will be accelerated, thus deteriorating the cycle life of the battery.

There has been studied to promote the capacity of a negative electrode comprising the aforementioned carbonaceous materials. For example, a coin type battery provided with a cathode comprising a sintered body of an epoxy novolak resin having pores 7.4 to 8.8 angstroms in diameter which have been formed by means of a small angle X-ray scattering method and with an anode formed of a lithium foil is disclosed in Table II of J. Electrochem. Soc., Vol. 142, No. 11, November 1995, p3668–3677.

Further, a coin type lithium secondary battery provided with a cathode comprising a pyrolytic epitaxial carbon 3.47 angstroms in $d_{002}$ (as measured by means of X-ray diffraction) and containing 1.8% of Si atom, and with an anode formed of a lithium foil, the capacity per weight of the battery being 363 mAh/g, is disclosed in J. Electrochem. Soc., Vol. 142, No. 2, February 1995, p326–332.

SUMMARY OF THE INVENTION

Accordingly, the object of the present invention is to provide a lithium secondary battery comprising an improved negative electrode comprising a carbonaceous material, which is improved in discharge capacity as well as in cycle life.

Namely, according to the present invention, there is provided a lithium secondary battery comprising a positive electrode, a negative electrode comprising a carbonaceous material which is capable of absorbing and desorbing lithium ions, and a nonaqueous electrolyte;

wherein the carbonaceous material has a region of amorphous carbon structure and a region of graphite structure, and the carbonaceous material has a true density of 1.8 g/cm³ or more and a peak in powder X-ray diffraction which corresponds to not more than 0.340 nm in an interplanar spacing $d_{002}$ derived from (002) reflection.

According to the present invention, there is further provided a lithium secondary battery comprising a positive electrode, a negative electrode comprising a carbonaceous material which is capable of absorbing and desorbing lithium ions, and a nonaqueous electrolyte;

wherein the carbonaceous material has a region of amorphous carbon structure and a region of graphite structure;

the carbonaceous material has a true density of 1.8 g/cm$^3$ or more and a peak in powder X-ray diffraction which corresponds to not more than 0.340 nm in an interplanar spacing $d_{002}$ derived from (002) reflection; and the region of amorphous carbon structure has pores 0.1 to 20 nm in diameter as measured by means of a small angle X-ray scattering method.

According to the present invention, there is further provided a lithium secondary battery comprising a positive electrode, a negative electrode comprising a carbonaceous material which is capable of absorbing and desorbing lithium ions, and a nonaqueous electrolyte;

wherein the carbonaceous material has a region of amorphous carbon structure and a region of graphite structure;

the carbonaceous material has a true density of 1.8 g/cm$^3$ or more and a peak in powder X-ray diffraction which corresponds to not more than 0.340 nm in an interplanar spacing $d_{002}$ derived from (002) reflection; and at least one of the interplanar spacings $d_{002}$ derived from (002) reflection in the region of amorphous carbon structure is 0.370 nm or more.

Further, according to the present invention, there is provided a lithium secondary battery comprising a positive electrode, a negative electrode comprising a carbonaceous material which is capable of absorbing and desorbing lithium ions, and a nonaqueous electrolyte;

wherein the carbonaceous material comprises at least one kind of elements M selected from the group consisting of Mg, Al, Si, Ca, Sn and Pb and has a peak in powder X-ray diffraction which corresponds to not more than 0.344 nm in an interplanar spacing $d_{002}$ derived from (002) reflection.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENTS

This invention will be further explained with reference to a lithium secondary battery (for example, a cylindrical nonaqueous electrolyte secondary battery) shown in FIG. 1.

Figure 1:
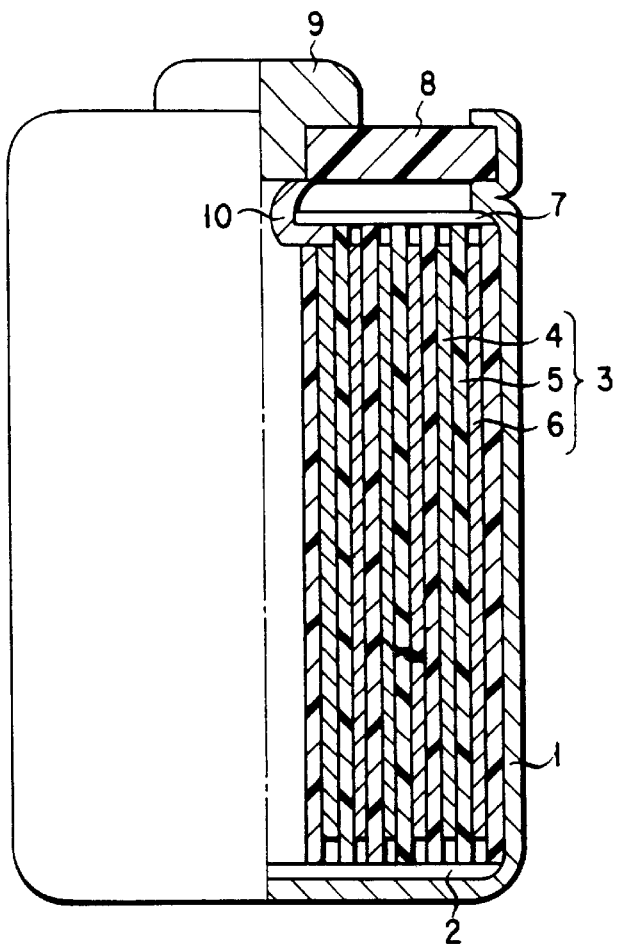
FIG. 1 is a partially sectioned view of a lithium secondary battery according to one embodiment of the present invention.

Referring to FIG. 1, a bottomed cylindrical case 1 made of stainless steel for example is provided at the bottom thereof with an insulating body 2. An electrode assembly (a group of electrodes) 3 is housed in the cylindrical case 1. The electrode assembly 3 is constructed such that a strip-like laminate body comprising a positive electrode 4, a separator 5 and a negative electrode 6 stacked in this order is spirally wound with the separator 5 being disposed at the outermost side of the electrode assembly 3.

The cylindrical case 1 is filled with an electrolyte. An insulating paper 7 having an opening at the center is disposed over the electrode assembly 3 placed in the cylindrical case 1. An insulating seal plate 8 is mounted at the upper opening of the cylindrical case 1 and hermetically fixed to the cylindrical case 1 by caulking the upper opening portion of the case 1 inwardly. A positive electrode terminal 9 is fitted in the central opening of the insulating seal plate 8. One end of a positive electrode lead 10 is connected to the positive electrode 4 and the other end thereof is connected to the positive electrode terminal 9. The negative electrode 6 is connected via a negative lead (not shown) to the cylindrical case 1 functioning as a negative terminal.

Next, the details of the positive electrode 4, the separator 5, the negative electrode 6 and the nonaqueous electrolyte will be explained.

(1) Positive Electrode 4

The positive electrode 4 can be manufactured by the steps of; mixing a positive electrode active material with a conductor agent and a binder, emulsifying the resultant mixture in a suitable solvent, coating the resultant emulsion on a collector and drying the emulsion to form a thin plate-like electrode.

As for the positive electrode active material, various kinds of oxides, such as manganese dioxide, lithium/manganese composite oxide, lithium-containing nickel oxide, lithium-containing cobalt oxide, lithium-containing nickel cobalt oxide, lithium-containing iron oxide and lithium-containing vanadium oxide; or chalcogen compounds such as titanium disulfate or molybdenum disulfate may be employed. Among them, lithium cobalt oxide {for example, $Li_xCoO_2$ ($0.8 \leq x \leq 1$)}, lithium nickel oxide (for example, $LiNiO_2$) and lithium manganese oxide (for example, $LiMn_2O_4$, $LiMnO_2$) are preferable in view of obtaining a high voltage.

As for the conductor agent, acetylene black, carbon black or graphite for example may be used.

As for the binder, polytetrafluoroethylene (PTFE), polyvinylidene fluoride (PVdF), ethylene-propylene-diene copolymer (EPDM) or styrene-butadiene rubber (SBR) for example may be employed.

Preferable mixing ratio of these positive electrode active material, conductor agent and binder may be: 80 to 95% by weight for the positive electrode active material, 3 to 20% by weight for the conductor agent and 2 to 7% by weight for the binder.

As for the current collector, aluminum foil, stainless foil and nickel foil for example are preferable for use.

(2) Separator 5

As for the separator 5, a synthetic resin nonwoven fabric, polyethylene porous film or polypropylene porous film for instance may be employed.

(3) Negative Electrode 6

As for the negative electrode 6, those containing a carbonaceous material which is capable of absorbing and desorbing lithium ion may be employed. In particular, the carbonaceous material should be of a multi-phase structure having a region of graphite structure and a region of amorphous carbon structure. Further, the carbonaceous material should preferable have a peak in powder X-ray diffraction which corresponds to not more than 0.340 nm in an interplanar spacing $d_{002}$ derived from (002) reflection of a graphite crystallite and a true density of 1.8 g/cm$^3$ or more.

The interplanar spacing between (002) carbon planes, i.e. $d_{002}$ can be determined from the location and half-width value of a peak in a diffraction diagram to be obtained from a powder X-ray diffraction. As for a method of calculating this $d_{002}$, it is possible to employ a half-power band width mid-point method which is stipulated in the Method described in "Tanso", p25 (1963). In the measurement of the powder X-ray diffraction, CuKα is employed as an X-ray source and a high purity silicon is employed as a standard material.

Figure 2:
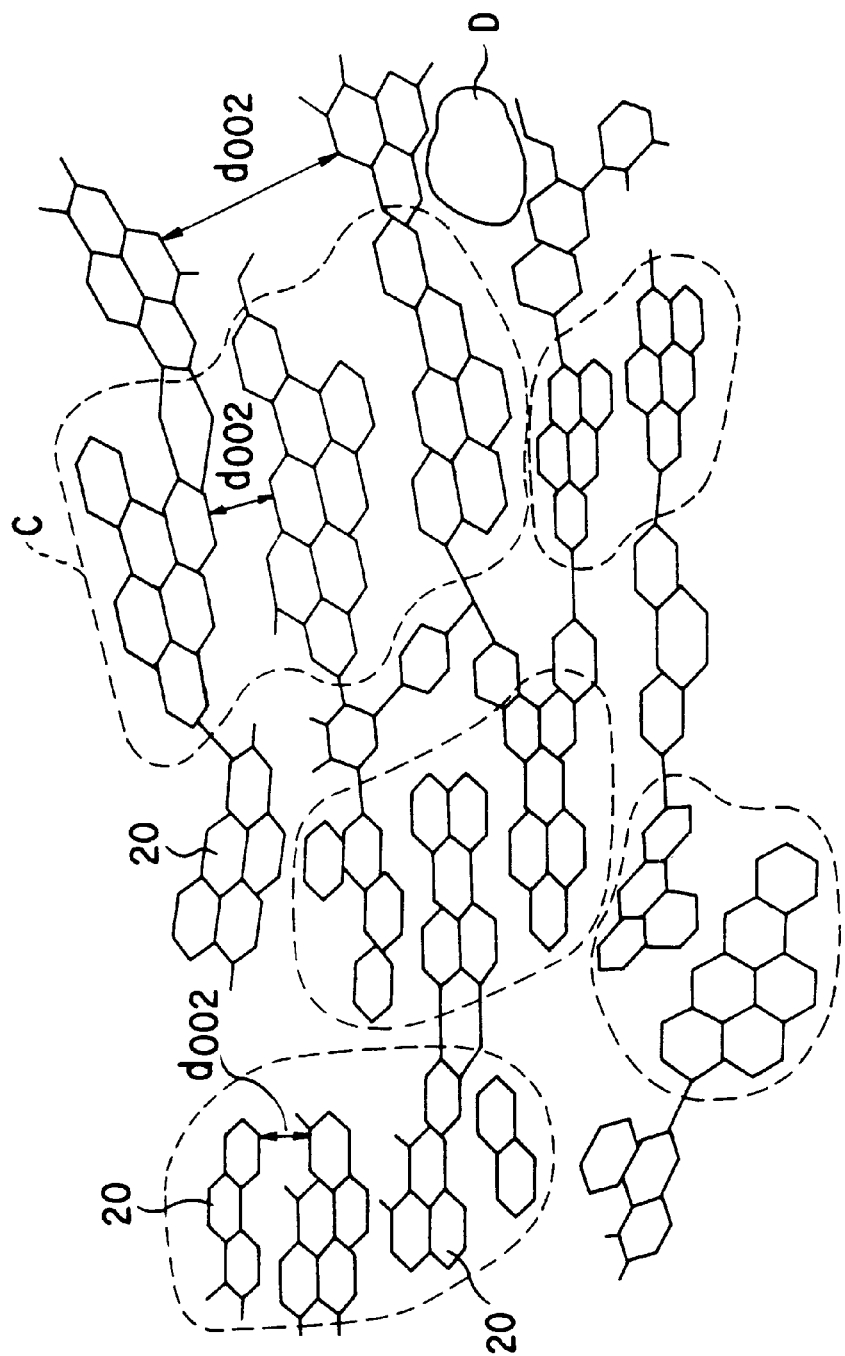
FIG. 2 is a schematic view showing one example of a fine texture of a carbonaceous material contained in a negative electrode of lithium secondary battery according to the present invention.

FIG. 2 illustrates a schematic view showing one example of a fine texture of the aforementioned carbonaceous material. As shown in FIG. 2, the carbonaceous material is of multi-phase structure and has a region of graphite structure (a graphite structure region). This graphite structure region is mainly constituted by a graphite crystallite C whose a plurality of carbon planes 20 are arranged with a definite regularity. This carbonaceous material has a peak in powder X-ray diffraction which corresponds to not more than 0.340 nm in $d_{002}$. Such a peak can be ascribed to the aforementioned graphite structure region. On the other hand, the carbonaceous material has also a region of amorphous carbon structure (amorphous carbon structure region). In this amorphous carbon structure region, any regularity in the arrangement of carbon planes 20 of a graphite crystallite is no longer existed and a pore (crystal defect) as shown by the region D can be found therein. In the amorphous carbon structure region, the diameter of the pore should preferably be in the range of 0.1 to 20 nm as measured by means of a small angle X-ray scattering method, at least one of the interplanar spacings $d_{002}$ derived from (002) reflection should preferably be 0.370 nm or more, or the diameter should preferably be 0.1 to 20 nm and at least one of the interplanar spacings should preferably be 0.370 nm or more. Most of the interplanar spacings of 0.370 nm or more can be ascribed to the existence of the pore. However, if the abundance ratio of the interplanar spacing $d_{002}$ of 0.370 nm or more is less than the detection limit (about 10% by weight) of the powder X-ray diffraction, a peak corresponding to not less than 0.370 nm in $d_{002}$ can no longer be found in the powder X-ray diffraction.

As mentioned above, the carbonaceous material has a peak in powder X-ray diffraction which corresponds to not more than 0.340 nm in $d_{002}$. It would be difficult, with an employment of a carbonaceous material not having such a peak, to improve the discharge capacity of a lithium secondary battery. The carbonaceous material according to this invention may be the one which has not only a peak corresponding to not more than 0.340 nm in $d_{002}$, but also a peak corresponding to more than 0.340 nm in $d_{002}$ in powder X-ray diffraction. However, a carbonaceous material has a peak corresponding to 0.370 nm or more in $d_{002}$ in powder X-ray diffraction may possibly be low in true density, i.e. less than 1.8 g/cm$^3$ in true density, thus possibly deteriorating the capacity per volume (mAh/cc) of the negative electrode. Accordingly, the carbonaceous material should preferably have a peak corresponding to 0.338 nm or less in $d_{002}$ in powder X-ray diffraction. More preferably, the carbonaceous material should have a peak corresponding to 0.3354 nm to 0.340 nm (most preferably 0.3354 nm to 0.338 nm) in $d_{002}$ in powder X-ray diffraction.

The true density of the aforementioned carbonaceous material should preferably be not less than 1.8 g/cm$^3$. If the true density of the aforementioned carbonaceous material is less than 1.8 g/cm$^3$, the area of the graphite structure region in the carbonaceous material becomes insufficient or the graphitization degree of the graphite structure region is lowered, thus deteriorating the capacity per volume of the negative electrode. The true density of the carbonaceous material is 2.25 g/cm$^3$ if the fine texture thereof is consisted solely of graphite structure region. Therefore, with a view to obtain a carbonaceous material having a fine texture where the graphite structure region and the amorphous structure region are co-existed in a suitable ratio, the upper limit in true density of the carbonaceous material should preferably be 2.2 g/cm$^3$. Therefore, more preferable true density of the carbonaceous material is in the range of 2.0 to 2.2 g/cm$^3$.

The measurement of the diameter of the pore according to the small angle X-ray scattering method can be performed by the method-which is described in J. Electrochem. Soc., vol. 142, No. 11, November 1995, p3668–3677.

Namely, the measurement was performed in the arrangement of transmission configuration using a powder X-ray apparatus (D5000; a trade name, Siemens Co., Ltd.) wherein Cu·Kα was employed as the bulb. The conditions for the measurement were as follows.

The sample holder employed was formed of a chamber 13 mm by 13 mm in size, 9 mm in height and 1.5 mm in thickness. This sample holder was arranged in the X-ray apparatus such that it orthogonally intercrossed with the primary beam. As for the window material, a high molecular film (Kapton foil) having a thickness of 25 μm was employed. The quantity of the carbonaceous material to be put in the sample holder was set to fall within the range of 150 mg to 200 mg. The incident angle and the antiscatter angle were both set to the same angle of 0.1°. The width of receiving slit was set to 0.1 mm.

The scattering angle was increased from 0.4° up to 10° in 0.05° increments so as to measure the small angle scattering intensity in each scattering angle. Then, the radius of gyration (Rg) of the pore was calculated from the following equation (1) with the average value of the scattering intensity thus obtained being defined as I(q).

$$I(q) \; N \times V^2 \times \exp(-q^2 Rg^2/3) \tag{1}$$

wherein q denotes a wave vector, N denotes the number of pores in the carbonaceous material, and V represents the total volume of the pores.

Then, the radius of gyration (Rg) thus calculated was inserted in the following equation (2) to obtain the diameter (Rs) of the pores in the carbonaceous material as measured by means of the small angle X-ray scattering method.

$$Rg = (3/5)^{1/2} \times Rs \tag{2}$$

The diameter of the pore (crystal defect) in the amorphous carbon structure of the aforementioned carbonaceous material as measured by means of the small angle X-ray scattering method should preferably be in the range of from 0.1 to 20 nm. If the diameter of the pore falls outside this range, the amount of lithium ions to be absorbed in the amorphous carbon structure will be decreased, thus possibly failing to obtain a high capacity of the lithium secondary battery. The diameter of the pore should more preferably be in the range of 0.5 to 5 nm, most preferably in the range of 0.5 to 2 nm.

The aforementioned carbonaceous material in the negative electrode may be in the form of fibers, spherical particles or a mixture of fibers and spherical particles. The carbon fibers may be milled, or not be milled.

(1) Carbon Fibers

An average fiber length of the fibers should preferably be in the range of 10 to 100 $\mu$m.

An average diameter of the fibers should preferably be in the range of 1 to 20 $\mu$m.

An average specific surface area of the fibers should preferably be in the range of 0.1 to 5 m$^2$/g.

If the aforementioned fibers is 10 to 100 $\mu$m in average fiber length and 1 to 20 $\mu$m in average diameter of the fiber, the aspect ratio (length of fiber/diameter of fiber) of thereof should preferably be in the range of 2 to 10. If the aspect ratio of the carbon fibers is less than 2, the ratio of the cross-section of the carbon fibers exposing on the surface of the negative electrode becomes excessive, resulting in an increase of the ratio of absorption/desorption reaction through the cross-section of carbon fibers, thus causing a retardation of the movement of Li ions toward the interior of the carbon fibers, thus possibly deteriorating the large current discharge performance of the battery. Moreover, if the aspect ratio of the carbon fibers is less than 2, the decomposition of electrolyte may be caused to deteriorate the charge/discharge efficiency of the battery, and at the same time, any increase in packing density of the carbon fibers in the negative electrode up to 1.3 g/cm$^3$ or more for instance may become difficult. On the other hand, if the aspect ratio of the carbon fibers exceeds over 10, the passing of the carbon fibers through the aforementioned separator may become easier, thus possibly inviting a short circuit between the positive electrode and the negative electrode.

As for the carbon fibers that can be obtained by milling carbon fibers, the average particle diameter (size) thereof should preferably be in the range of 1 to 100 $\mu$m, more preferably in the range of 2 to 40 $\mu$m.

Figure 3:
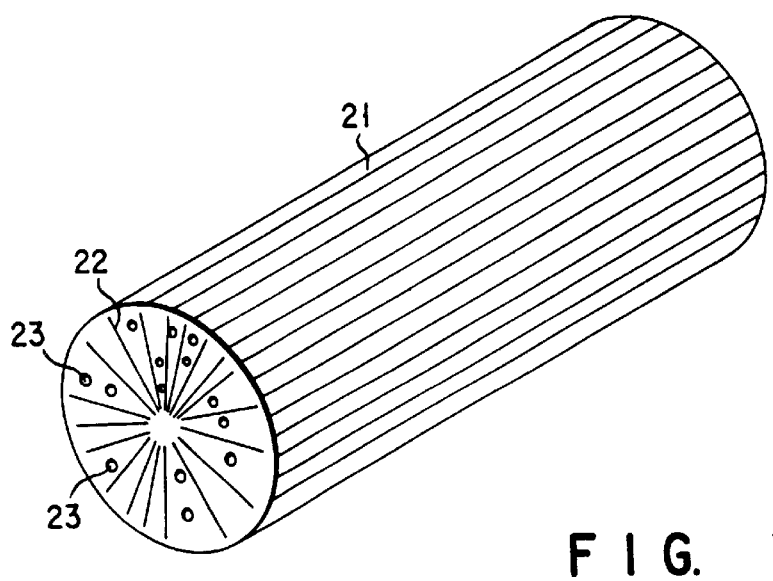
FIG. 3 is a perspective view illustrating one example of fibrous carbonaceous particles contained in a negative electrode of lithium secondary battery according to the present invention.

The orientation of the graphite crystallites in the graphite structure region of the carbon fibers should preferably be of a radiant type. By the expression that the orientation of the crystallites is of a radiant type, it is meant that the layer spacings between carbon planes of the graphite crystallites existing at the outer peripheral surface of the carbon fiber is directed toward the outer peripheral surface of the carbon fiber. The definition of this radiant type orientation includes the orientations belonging to the lamellar type or the Brooks-Taylor type. FIG. 3 illustrates one example out of carbon fibers of radiant type, where all of the layer spacings between carbon planes of graphite crystallites 22 contained in a carbon fiber 21 are directed toward the outer peripheral surface of the carbon fiber 21. By the way, this carbon fiber 21 contains pores 23 in the amorphous carbon structure region. Preferable examples of the carbon fiber among the carbon fibers of radiant type are those whose orientation is suitably disordered. This carbon fiber having a suitably disordered orientation is high in strength and minimal in structural degradation resulting from the absorption/desorption of Li ions, thus improving the life of the secondary battery. In particular, a carbon fiber where graphite crystallites disposed at the inner portion of the particle are disordered in orientation is preferable for use. It is possible, with the employment of the carbon fiber having such a feature as mentioned above, to facilitate the absorption/desorption reaction of Li ions through the outer periphery of the fiber and to improve not only the cycle life but also the high speed charge/discharge performance of the battery. However, if the orientation of graphite crystallites in the carbon fiber is of coaxial and co-tubular (onion type), the internal diffusion of lithium ions may be inhibited.

Furthermore, the carbon fibers comprising graphite crystallites whose orientation belongs to the aforementioned radiant type should preferably be prepared from carbonated or graphitized mesophase pitch based carbon fibers.

(2) Spherical Carbonaceous Particles

An average particle diameter of the spherical carbonaceous particles should preferably be in the range of 1 to 100 $\mu$m, more preferably 2 to 40 $\mu$m.

The ratio of shorter diameter/longer diameter of the spherical carbonaceous particles should preferably be 1/10 or more. More preferably, the shorter diameter/longer diameter ratio of the spherical carbonaceous particles should be controlled to 1/2 or more, or approximately spherical in shape.

Further, the spherical carbonaceous particles should preferably be prepared from carbonated or graphitized mesophase globule.

The orientation of the graphite crystallites in the spherical carbonaceous particles may be of a radiant type, the lamellar type or the Brooks-Taylor type where the radiant type and lamellar type are intermixed. The definition of the Brooks-Taylor type structure is described in "Chemical & Physics Carbon" Vol. 14, 1968, p243; and in "Carbon" Vol. 13, 1965, p185. Graphite crystallite exhibiting a concentric spherical orientation is also known.

A carbonaceous material having a region of amorphous carbon structure and a region of graphite structure, a true density of 1.8 g/cm$^3$ or more and a peak in powder x-ray diffraction which corresponds to not more than 0.340 nm in $d_{002}$ can be manufactured according to any of the following methods (1) to (3).

(1) A mixture comprising a graphitizable carbon precursor (for example, coke or mesophase pitch to be obtained from raw coal pitch or petroleum pitch) and a non-graphitizable carbon precursor (for example, isotropic pitch, polyacrylonitrile, furlfuryl alcohol, furan resin, phenol resin, cellulose, sucrose or polyvinyl chloride) is heat-treated at a temperature of 800 to 3,000° C. to obtain the aforementioned carbonaceous material.

(2) A catalyst selected from Fe, Co, Ni, Ca, Mn, Al and Si is added to a graphitizable carbon precursor mentioned above or to a non-graphitizable carbon precursor mentioned above, and then the resultant mixture is heat-treated at a temperature of 1,000 to 2,000° C. in the case of the graphitizable carbon precursor, or at a temperature of 1,500 to 3,000° C. in the case of the non-graphitizable carbon precursor to obtain the aforementioned carbonaceous material.

(3) Natural graphite, artificial graphite, graphitized mesophase pitch based carbon fibers or graphitized mesophase globule is subjected to an acid treatment, an ion implantation or a vapor phase oxide treatment, whereby mechanically introducing pores (crystal defects) into the graphite crystal of these materials, thus obtaining the aforementioned carbonaceous material.

The negative electrode 6 can be manufactured by the steps of mixing any of above-mentioned carbonaceous materials with a binder dispersed in a suitable solvent (such as an organic solvent) to obtain an emulsion, coating the resultant emulsion on a collector, drying the emulsion and subjecting the resultant body to a press working. This press working may be performed by means of a multi-stage press working where 2 to 5 times of pressing are repeated.

As for the binder, polytetrafluoroethylene (PTFE), polyvinylidene fluoride (PVdF), ethylene-propylene-diene copolymer (EPDM), styrene-butadiene rubber (SBR) or carboxymethyl cellulose (CMC) for example may be employed.

A preferable mixing ratio of the aforementioned carbonaceous material with the binder may be: 90 to 98% by weight for the carbonaceous material and 2 to 10% by weight for the binder. The content of carbonaceous material in the negative electrode should preferably be controlled to a range of 5 to 20 mg/cm$^2$.

As for the current collector, copper foil, stainless foil and nickel foil for example are preferably for use.

(4) The Electrolyte

The nonaqueous electrolyte to be employed herein may be produced by dissolving an electrolytic salt in an nonaqueous solvent.

As for the nonaqueous solvent, any known nonaqueous solvent which has been employed as a solvent for a lithium secondary battery can be employed. Although it is not intended to be limited, a nonaqueous solvent mainly consisting of a mixed solvent comprising ethylene carbonate (EC) and at least one kind of nonaqueous solvent whose melting point is lower than that of aforementioned ethylene carbonate and whose donor number is 18 or less (hereinafter referred to as a second solvent) may be preferably employed. This nonaqueous solvent is advantageous in that it is stable against a negative electrode containing a carbonaceous material well developed in graphite structure, in that it is effective in suppressing the reductive or oxidative decomposition of electrolyte, and in that it is high in conductivity.

A nonaqueous electrolyte solely composed of ethylene carbonate is advantageous in that it can be hardly decomposed through a reduction by a graphitized carbonaceous material, but is accompanied with a drawback that the melting point thereof is relatively high (39° C. to 40° C.) and the viscosity thereof is relatively high, so that the conductivity thereof is small, thus making it unsuited for use as a secondary battery to be operated at the normal temperature. The second solvent to be used as a mixture with ethylene carbonate functions to make the viscosity of the mixed solvent lower than that of the aforementioned ethylene carbonate thereby promoting the conductivity of the mixed solvent. Furthermore, when the second solvent having a donor number of 18 or less (the donor number of ethylene carbonate is 16.4) is employed, the aforementioned ethylene carbonate can be easily and selectively solvated with lithium ion, so that the reduction reaction of the second solvent with the carbonaceous material well developed in graphitization is assumed to be suppressed. Further, when the donor number of the second solvent is controlled to not more than 18, the oxidative decomposition potential to the lithium electrode can be easily increased to 4V or more, so that it is possible to manufacture a lithium secondary battery of high voltage.

Preferable examples of the second solvent are linear carbons. Typical examples of them are dimethyl carbonate (DMC), methylethyl carbonate (MEC), diethyl carbonate (DEC), ethyl propionate, methyl propionate, propylene carbonate (PC), γ-butyrolactone (γ-BL), acetonitrile (AN), ethyl acetate (EA), propyl formate (PF), methyl formate (MF), toluene, xylene and methyl acetate (AM). These second solvents may be employed singly or in combination of two or more. More desirably, this second solvent should be selected from those having a donor number of 16.5 or less.

The viscosity of this second solvent should preferably be 28 cp or less at a temperature of 25° C.

The mixing ratio of the aforementioned ethylene carbonate in the mixed solvent should preferably be 10 to 80% by volume. If the mixing ratio of the ethylene carbonate falls outside this range, the conductivity of the solvent may be lowered or the decomposition of the solvent would be resulted, thereby deteriorating the charge/discharge efficiency. More preferable mixing ratio of the ethylene carbonate is 20 to 75% by volume. When the mixing ratio of ethylene carbonate in a nonaqueous solvent is increased to 20% by volume or more, the solvating effect of ethylene carbonate to lithium ions will be facilitated, thus the solvent decomposition-inhibiting effect thereof can be improved.

Preferable examples of the composition of the aforementioned mixed solvent are a composition comprising EC and MEC; a composition comprising EC, PC and MEC; a composition comprising EC, MEC and DEC; a composition comprising EC, MEC and DMC; and a composition comprising EC, MEC, PC and DEC; with the volume ratio of MEC being controlled within the range of 30 to 80%. By controlling the volume ratio of MEC to the range of 30 to 80%, more preferably 40 to 70%, the conductivity of the solvent can be improved. On the other hand, in view of suppressing the reductive decomposition reaction of the solvent, an electrolyte having carbon dioxide dissolved therein may be employed, thereby effectively improving both capacity and cycle life of the battery.

Water and organic peroxides (for example, glycols, alcohols and carboxylic acids) are main impurities that may be included in the aforementioned mixed solvent. These impurities are considered to become a cause of the formation of an insulating film on the surface of a graphitized substance, thereby increasing the surface resistance of the electrodes. Therefore, these impurities may give a bad influence to the battery, thereby not only deteriorating the cycle life or capacity thereof, but also increasing the-self-discharge during a high temperature (60° C. or more) storage of the battery. Because of these possibilities, the aforementioned impurities in an electrolyte containing a nonaqueous solvent should desirably be eliminated as much as possible. Specifically, the content of water should be controlled to not more than 50 ppm, and the content of organic peroxides should be controlled to not more than 1,000 ppm.

As for the electrolytic salts to be incorporated into the nonaqueous electrolyte, a lithium salt such as lithium perchlorate (LiClO$_4$), lithium hexafluorophosphate (LiPF$_6$), lithium borofluoride (LiBF$_4$), lithium hexafluoroarsenide (LiAsF$_6$), lithium trifluorometasulfonate (LiCF$_3$SO$_3$) and bis-trifluoromethyl sulfonylimide lithium [LiN(CF$_3$SO$_2$)$_2$] may be employed. Among them, LiPF$_6$, LiBF$_4$ and LiN(CF$_3$SO$_2$)$_2$ are preferable for use.

The content of aforementioned electrolytic salts in the nonaqueous solvent should preferably be 0.5 to 2.0 mol/l.

In FIG. 1, one example of a cylindrical lithium secondary battery has been explained. However, the lithium secondary battery according to this invention may be a rectangular lithium secondary battery. The electrode assembly to be housed in the case of the battery may not be spiral, but may be a laminate structure where a positive electrode, a separator and a negative electrode are stacked in the mentioned order.

Another example of the lithium secondary battery according to the present invention comprises a positive electrode, a negative electrode comprising a carbonaceous material which is capable of absorbing and desorbing lithium ions, and a nonaqueous electrolyte; wherein the carbonaceous material constituting the negative electrode comprises at least one kind of elements M selected from the group consisting of Mg, Al, Si, Ca, Sn and Pb and has a peak in powder X-ray diffraction which corresponds to not more than 0.344 nm in an interplanar spacing $d_{002}$ derived from (002) reflection.

This secondary battery is applicable to the cylindrical lithium secondary battery having a structure as illustrated in FIG. 1. It is also possible to apply this secondary battery to a rectangular lithium secondary battery where an assembly comprising a plurality of positive electrodes and a plurality of negative electrodes with a separator being interposed between each pair of the positive electrode and the negative electrode is housed in the case (or vessel) of the battery.

As for the positive electrode, the separator and the electrolyte, the same as those employed in the above-mentioned example may be employed in this case.

1) Negative Electrode

As for the negative electrode, those containing a carbonaceous material which is capable of absorbing and desorbing lithium ion may be employed. This carbonaceous material comprises at least one kind of elements M (heterogeneous elements M) selected from the group consisting of Mg, Al, Si, Ca, Sn and Pb, and has a peak in powder X-ray diffraction which corresponds to not more than 0.344 nm in an interplanar spacing $d_{002}$ derived from (002) reflection of a graphite crystallite.

The method of measuring the interplanar spacing derived from (002) reflection and the definition of the interplanar spacing derived from (002) reflection are the same as explained above.

As mentioned above, the carbonaceous material has a peak in powder X-ray diffraction which corresponds to not more than 0.344 nm in $d_{002}$. It would be difficult, with an employment of a carbonaceous material not having such a peak, to improve the discharge capacity of a lithium secondary battery. The carbonaceous material according to this invention may be the one which has not only a peak corresponding to not more than 0.344 nm in $d_{002}$, but also a peak corresponding to more than 0.344 nm in $d_{002}$ in powder X-ray diffraction. However, a carbonaceous material having a peak corresponding to more than 0.344 nm in $d_{002}$ in powder X-ray diffraction may possibly be low in the ratio of $d_{002}$ of not more than 0.344 nm, in graphitization and in true density. If the true density is lowered, the capacity per volume (mAh/cc) of the negative electrode may be deteriorated. Accordingly, the carbonaceous material should preferably have a peak corresponding to 0.340 nm or less in $d_{002}$ in powder X-ray diffraction. More preferably, the carbonaceous material should have a peak corresponding to 0.3354 nm to 0.344 nm (most preferably 0.3354 nm to 0.340 nm) in $d_{002}$ in powder X-ray diffraction.

It is assumed that the element M is disposed in a space between the graphite crystallites of the carbonaceous material or between the carbon planes of the graphite crystallite. This element M enables a larger amount of lithium ions to be absorbed and desorbed per unit volume as compared with the carbonaceous material. Therefore, when this element M is incorporated into a carbonaceous material having a specific peak as mentioned above, the capacity of the negative electrode can be improved. In particular, the employment of Si, Pb, Al and Ca are preferable. If two or more kinds of element M are to be incorporated into the carbonaceous material, the employment of combination of Si and Al, or combination of Ca and Mg is preferable.

The carbonaceous material may preferably contain this element M in an amount of 0.1 to 10% in atomic ratio (the number of atom of the element M in relative to the number of carbon atom in the carbonaceous material). If the content of the element M is less than 0.1% in atomic ratio, the content of element M will be too little so that the effect to increase the capacity of the negative electrode that can be brought about by the introduction of the element M may become insufficient. On the other hand, if the content of the element M exceeds over 10% in atomic ratio, a large amount of metal carbides may be produced in the carbonaceous material, thus deteriorating the cycle life of the battery. Therefore, more preferable content of the element M is 1 to 8% in atomic ratio.

The true density of the aforementioned carbonaceous material should preferably be not less than 1.7 g/cm$^3$. If the true density of the aforementioned carbonaceous material is less than 1.7 g/cm$^3$, the ratio of $d_{002}$ of not more than 0.344 nm may be decreased, thus deteriorating the capacity per volume of the negative electrode. Therefore, the true density of the carbonaceous material should preferably be 2.0 g/cm$^3$ or more. The upper limit in true density of the carbonaceous material should preferably be set such that the $d_{002}$ of not more than 0.344 nm occupies at a high ratio in the carbonaceous material. Further, the upper limit of true density may be fluctuated depending on the kind and content of the element M in the carbonaceous material.

The aforementioned carbonaceous material in the negative electrode may be in the form of fibers, spherical particles or a mixture of fibers and spherical particles. The carbon fibers may be milled, or not be milled.

(1) Carbon Fibers

An average fiber length of the carbon fibers should preferably be in the range of 10 to 100 µm.

An average diameter of the fibers should preferably be in the range of 1 to 20 µm.

An average specific surface area of the carbon fibers should preferably be in the range of 0.1 to 5 m$^2$/g.

If the aforementioned carbon fibers is 10 to 100 µm in average fiber length and 1 to 20 µm in average diameter of the fiber, the aspect ratio (length of fiber/diameter of fiber) of thereof should preferably be in the range of 2 to 10.

As for the carbon fibers that can be obtained by milling carbon fibers, the average particle diameter (size) thereof should preferably be in the range of 1 to 100 µm, more preferably in the range of 2 to 40 µm.

The orientation of the graphite crystallites in the graphite structure region of the carbon fibers should preferably be of a radiant type. The definition of this radiant type orientation includes the orientations belonging to the lamellar type or the Brooks-Taylor type. Preferable examples of the carbon fiber among the carbon fibers of radiant type are those whose orientation is suitably disordered. This carbon fiber having a suitably disordered orientation is high in strength and minimal in structural degradation resulting from the absorption/desorption of Li ions, thus improving the cycle life. In particular, a carbon fiber where graphite crystallites disposed at the inner portion of the particle are disordered in orientation is preferable for use. It is possible, with the employment of the carbon fiber having such a feature as mentioned above, to facilitate the absorption/desorption reaction of Li ions through the outer periphery of the fiber and to improve not only the cycle life but also the high speed charge/discharge performance of the battery. However, if the orientation of graphite crystallites in the carbon fiber is of coaxial and co-tubular (onion type), the internal diffusion of lithium ions may be inhibited.

Furthermore, the carbon fibers comprising graphite crystallites whose orientation belongs to the aforementioned radiant type should preferably be prepared from carbonated or graphitized mesophase pitch based carbon fibers.

(2) Spherical Carbonaceous Particles

An average particle diameter of the spherical carbonaceous particles should preferably be in the range of 1 to 100 µm, more preferably 2 to 40 µm.

The ratio of shorter diameter/longer diameter of the spherical carbonaceous particles should preferably be 1/10 or more. More preferably, the shorter diameter/longer diameter ratio of the spherical carbonaceous particles should be controlled to 1/2 or more, or approximately spherical in shape.

Further, the spherical carbonaceous particles should preferably be prepared from carbonated or graphitized mesophase globule.

The orientation of the graphite crystallites in the spherical carbonaceous particles may be of a radiant type, the lamellar type or the Brooks-Taylor type where the radiant type and lamellar type are intermixed. Graphite crystallite exhibiting a concentric spherical orientation is also known.

This carbonaceous material can be manufactured by a method comprising the steps of adding a compound containing the element M to a graphitizable carbon precursor (for example, coke or mesophase pitch to be obtained from raw coal pitch or petroleum pitch), to a non-graphitizable carbon precursor (for example, isotropic pitch, polyacrylonitrile, furlfuryl alcohol, furan resin, phenol resin, cellulose, sucrose or polyvinyl chloride), or to a mixture comprising the aforementioned graphitizable carbon precursor and non-graphitizable carbon precursor to obtain a mixture, and then heat-treating the resultant mixture at a temperature of 600 to 3,000° C. to obtain the aforementioned carbonaceous material. According to this manufacturing method, the carbon precursor can be graphitized up to a high graphitization degree while introducing the element M into the carbon precursor at the heat-treatment temperature of 600 to 3,000° C., thus making it possible to obtain a carbonaceous material containing the element M and having a peak in powder X-ray diffraction which corresponds to not more than 0.344 nm in $d_{002}$.

The compound containing an element M may include a single substance such as Mg, Al, Si, Ca, Sn or Pb. Among them, a compound which can be homogeneously dissolved or uniformly admixed in the carbon precursor, such as silicon carbide (SiC), magnesium silicide ($Mg_2Si$), aluminum carbide ($Al_4C_3$), tin oxalate, calcium carbide ($CaC_2$) or lead carbonate is preferable for use.

The reason for limiting the heat-treatment temperature to the aforementioned range will be explained as follows.

If the heat-treatment temperature is less than 600° C., the condensation polymerization of the carbon precursor becomes insufficient and the graphitization of the carbon precursor would not proceed sufficiently. On the other hand, if the heat-treatment temperature exceeds over 3,000° C., the element M may be evaporated, thus making it difficult to sufficiently introduce the element M into the carbon precursor. With a view of improving the graphitization of the carbon precursor, the heat-treatment temperature should preferably be controlled to a range of 1,500 to 3,000° C., more preferably to a range of 2,000 to 3,000° C.

In this method of preparing the carbonaceous material, a catalyst such as B, Mn or Cr may be added to the reaction mixture. When such a catalyst is added to the reaction mixture, the carbonaceous material can be manufactured at a low heat-treatment temperature. When the carbonaceous material useful in this invention is manufactured in this manner, the catalyst employed may be left in the resultant carbonaceous material. However, the characteristics of the negative electrode would not be damaged by the presence of the catalyst left therein. When boron (B) is employed as a catalyst in the aforementioned heat-treatment for the preparation of the carbonaceous material, thus allowing the boron to be left in the carbonaceous material, the capacity of the negative electrode containing the resultant carbonaceous material will be improved, since boron enables a larger amount of lithium ions to be absorbed and desorbed per unit volume. Accordingly, the carbonaceous material to be employed for the negative electrode of a secondary battery according to this invention may contain a trace amount of B, Mn and Cr.

The negative electrode can be manufactured by the steps of mixing any of above-mentioned carbonaceous materials with a binder dispersed in a suitable solvent (such as an organic solvent) to obtain an emulsion, coating the resultant emulsion on a collector, drying the emulsion and subjecting the resultant body to a press working. This press working may be performed by means of a multi-stage press working where 2 to 5 times of pressing are repeated.

As for the binder, polytetrafluoroethylene (PTFE), polyvinylidene fluoride (PVdF), ethylene-propylene-diene copolymer (EPDM), styrene-butadiene rubber (SBR) or carboxymethyl cellulose (CMC) for example may be employed.

A preferable mixing ratio of the aforementioned carbonaceous material with the binder may be: 90 to 98% by weight for the carbonaceous material and 2 to 10% by weight for the binder. The content of carbonaceous material in the negative electrode should preferably be controlled to a range of 5 to 20 $mg/cm^2$.

As for the current collector, copper foil, stainless foil and nickel foil for example are preferable for use.

The carbonaceous material to be employed for the negative electrode of the lithium secondary battery according to this invention has a region of amorphous carbon structure and a region of graphite structure, a true density of 1.8 $g/cm^3$ or more and a peak in powder X-ray diffraction which corresponds to not more than 0.340 nm in an interplanar spacing $d_{002}$ derived from (002) reflection. It is possible with this negative electrode to prominently improve the capacity per unit volume of the electrode (for example, 900 mAh/cc or more). Therefore, the lithium secondary battery comprising such a negative electrode will exhibit a prominently improved discharge capacity and an improved charge/discharge cycle life. The mechanism for these improvements may be explained as follows.

In the carbonaceous material, the graphite structure region and the amorphous structure region are co-existed in a suitable ratio, and the ratio of the $d_{002}$ falling in the range of 0.340 nm or less in the $d_{002}$ of the graphite structure region is relatively high. Since this carbonaceous material having such features is capable of greatly improving the diffusion rate of lithium ions in the graphite structure region, it is possible to cause the amorphous structure region to take part in the absorption/desorption of lithium ions. Whereas, a carbonaceous material not having the aforementioned peak is low in graphitization degree of the graphite structure region and also low in the diffusion rate of lithium ions in the graphite structure region, so that it is almost impossible to cause the amorphous structure region to take part in the absorption/desorption of lithium ions, even if the carbonaceous material has a amorphous structure region. Therefore, a negative electrode containing such a carbonaceous material is relatively limited in the amount of absorption/desorption of lithium ions so that the capacity per unit volume of the negative electrode will be deteriorated. Moreover, a lithium secondary battery comprising such a negative electrode will be poor in charge/discharge efficiency. By contrast, since a large amount of lithium ions can be absorbed in the amorphous carbon structure region, if the amorphous carbon structure region of a carbonaceous material could be utilized as a lithium-ion site as in the case of this invention, the amount of absorption/desorption of lithium ions per unit volume of negative electrode can be greatly increased.

Furthermore, since any expansion and shrinkage of carbonaceous material resulting from the absorption/desorption of lithium ions can be attenuated by the amorphous carbon structure region, the negative electrode is effective in inhibiting the degradation of graphite structure of carbonaceous material resulting from the repetition of charge/discharge cycle, as well as in inhibiting the lowering of discharge capacity resulting from the repetition of charge/discharge cycle. As a result, the lithium secondary battery comprising this negative electrode will exhibit a prominently improved discharge capacity and an improved charge/discharge cycle life. Moreover, since this lithium secondary battery is very fast in absorption/desorption rate of lithium ions in the negative electrode, the initial charge/discharge efficiency of the battery will be improved.

It is possible, with the amorphous carbon structure region having pores 0.1 to 20 nm in diameter as measured by means of a small angle X-ray scattering method, to increase the amount of absorption/desorption of lithium ions in the amorphous carbon structure region. As a result, the lithium secondary battery comprising a negative electrode containing such a carbonaceous material will exhibit a prominently improved discharge capacity and hence a more improved charge/discharge cycle life.

If at least one of the interplanar spacings $d_{002}$ derived from (002) reflection in the region of amorphous carbon structure is 0.370 nm or more, it is possible to increase the amount of absorption/desorption of lithium ions in the amorphous carbon structure region. As a result, the lithium secondary battery comprising a negative electrode containing such a carbonaceous material will exhibit a prominently improved discharge capacity and hence a more improved charge/discharge cycle life.

If the amorphous carbon structure region has pores 0.1 to 20 nm in diameter as measured by means of a small angle X-ray scattering method, and at least one of the interplanar spacings $d_{002}$ derived from (002) reflection in the region of amorphous carbon structure is 0.370 nm or more, it is possible to increase the amount of absorption/desorption of lithium ions in the amorphous carbon structure region. As a result, the lithium secondary battery comprising a negative electrode containing such a carbonaceous material will exhibit a prominently improved discharge capacity and hence a more improved charge/discharge cycle life.

Since the carbon fibers whose graphite crystallites exhibits an orientation of radiant type is capable of absorbing and desorbing lithium ions not only through the cross-section thereof but also through the outer peripheral surface thereof, the absorption/desorption rate as well as the quantity of absorption/desorption of lithium ions at the negative electrode will be increased.

By constituting the carbon fibers of radiant type orientation with a carbonaceous material having a peak in powder X-ray diffraction which corresponds to not more than 0.340 nm in $d_{002}$ and a true density of 1.8 g/cm³ or more, the absorption/desorption rate as well as the quantity of absorption/desorption of lithium ions through the carbon fibers of radiant type orientation can be effectively increased. Therefore, the lithium secondary battery comprising a negative electrode containing such a carbonaceous material will exhibit a prominently improved discharge capacity at the occasion of rapid charging/discharging.

A lithium secondary battery according to another example of this invention is featured in that the negative electrode thereof comprises a carbonaceous material containing an element M (where M is at least one kind of elements selected from the group consisting of Mg, Al, Si, Ca, Sn and Pb), and having a peak in powder X-ray diffraction, which indicates the presence of an interplanar spacing ($d_{002}$) of not more than 0.344 nm derived from (002) reflection. Therefore, the lithium secondary battery comprising such a negative electrode will exhibit a prominently improved discharge capacity, a high capacity even at the occasion of rapid charging/discharging and an improved charge/discharge cycle life. The mechanism for these improvements may be explained as follows.

Since a carbonaceous material having a peak in powder X-ray diffraction which corresponds to not more than 0.344 nm in an interplanar spacing $d_{002}$ is featured as having a higher ratio of the interplanar spacings of not more than 0.344 nm of the carbonaceous material, the diffusion rate of lithium ions can be promoted. Therefore, such a carbonaceous material will allow an increased ratio of the element M which is capable of the absorption/desorption reaction of lithium ions. Moreover, since this carbonaceous material comprises a crystallite well developed in graphite structure, the true density of the carbonaceous material is relatively high. Therefore, a negative electrode comprising such a carbonaceous material is capable of rapidly absorbing lithium ions until $LiC_6$ is formed in the graphite structure region. At the same time, the element M is also capable of rapidly absorbing a large quantity of lithium ions. Accordingly, it is possible with the employment of this negative electrode to prominently improve the capacity per weight (mAh/g) as well as the capacity per volume (mAh/cc) thereof as compared with the negative electrode where the element M is introduced into a carbon material not having the aforementioned peak. As a result, the lithium secondary battery comprising such a negative electrode will exhibit a prominently improved discharge capacity and hence a more improved charge/discharge cycle life. Furthermore, it is possible with this lithium secondary battery comprising such a negative electrode to achieve an improvement in rapid charge/discharge efficiency, since the absorption/desorption rate of lithium ions at the negative electrode can be accelerated.

It is possible, by controlling the content of the element M in the carbonaceous material to 0.1 to 10% in atomic ratio, to effectively manifest the effect that can be obtained by the inclusion of element M in the carbonaceous material, i.e. the effect to increase the discharge capacity of battery, thus further improving the discharge capacity of the lithium secondary battery.

It is possible, by constituting the carbon fibers comprising graphite crystallites of radiant type orientation with a carbonaceous material having a peak in powder X-ray diffraction which corresponds to not more than 0.344 nm in $d_{002}$ and containing the element M, to effectively increase the absorption/desorption rate and the quantity of absorption/desorption of lithium ions through the carbon fibers of radiant type orientation. Therefore, the lithium secondary battery comprising a negative electrode containing such a carbonaceous material can be prominently improved in discharge capacity at the occasion of rapid charging/discharging.

The specific examples of this invention will be further explained with reference to FIG. 1 as follows.

EXAMPLE 1

First of all, 91% by weight of lithium cobalt oxide powder $LiCoO_2$, 3.5% by weight of acetylene black, 3.5% by weight of graphite, and 2% by weight of ethylene-propylene-diene monomer powder were mixed together with toluene to obtain a mixture, which was then coated on an aluminum foil (30 μm) collector. The resultant aluminum foil collector was press-worked to obtain a positive electrode.

On the other hand, phenol resin was added to mesophase pitch obtained from petroleum pitch to obtain a solution comprising 20% by volume of phenol resin. After having been spun and infusibilized, the resultant fibers was carbonized in an argon atmosphere at a temperature of 600° C. Then, the carbonized product was milled to obtain milled fibers 11 μm in average particle diameter and having a particle diameter distribution that not less than 90% of them being occupied by fibers having a particle diameter ranging from 1 to 80 μm and not more than 5% of them being occupied by fibers having a particle diameter of not more than 0.5 μm. Thereafter, the fibers were graphitized in an inert gas atmosphere at a temperature of 2,700° C. to manufacture milled carbon fibers.

The carbon fibers thus obtained were 7 μm in average diameter of fiber, 40 μm in average length and 20 μm in average particle diameter. The particle diameter distribution of the carbon fibers was such that not less than 90% by volume of them is occupied by fibers having a particle diameter ranging from 1 to 80 μm, fibers having a particle diameter of not more than 0.5 μm being 0% by volume. The specific surface area as measured by means of $N_2$ gas adsorption BET method was 1.2 m$^2$/g. The true density of carbon fibers was 2.0 g/cm$^3$. The co-existance of graphite structure region and amorphous carbon structure region in the fine texture of the carbon fibers was confirmed from the (002) lattice image of an x-ray diffraction. When the diameter of fine pores existing in large number in the amorphous carbon region was measured by means of the small angle x-ray scattering method, the diameter of the pores was found to be 0.5 to 20 nm. These carbon fibers exhibited in the powder X-ray diffraction a peak corresponding to 0.336 nm in an interplanar spacing $d_{002}$ between (002) faces and another peak corresponding to 0.370 nm in $d_{002}$. The peak corresponding to 0.336 nm in $d_{002}$ was assumed to have been originated from the graphite structure region of the carbon fibers. On the other hand, the peak corresponding to 0.370 nm in $d_{002}$ was assumed to have been originated from the amorphous carbon structure region of the carbon fibers. When the cross-section of the carbon fibers was observed using a SEM (scanning type electron microscope), the orientation of the graphite crystallites of the carbon fibers was found to be of radiant type. There were some degree of disturbance in orientation.

96.7% by weight of the mesophase pitch based carbon fibers was mixed with 2.2% by weight of styrene/butadiene rubber and 1.1% by weight of carboxylmethyl cellulose to obtain a mixture, which was then coated on a copper foil to be employed as a collector. After being dried, the copper foil was pressed thereby obtaining a negative electrode.

The positive electrode, a separator composed of a polyethylene porous film and the negative electrode was stacked in this order, and then the resultant stacked body was spirally wound with the separator being disposed at the outermost side to obtain an electrode assembly.

Hexafluorolithium phosphate (LiPF$_6$) was dissolved in a mixed solvent consisting of ethylene carbonate (EC) and methylethyl carbonate (MEC) (volume ratio: 50:50) to obtain a non-aqueous electrolyte, the concentration of LiPF$_6$ being 1.0 mol/l (solvent).

Finally, the electrode assembly and the non-aqueous electrolyte were placed in a bottomed cylindrical case made of stainless steel, thereby fabricating a cylindrical lithium secondary battery as shown in FIG. 1.

EXAMPLE 2

The same procedure as that of Example 1 was repeated to manufacture a cylindrical lithium secondary battery as shown in FIG. 1 except that a carbonaceous material as explained below was employed.

Natural graphite was finely pulverized in such a manner to obtain particles having an average particle diameter of not more than 1 μm, to which isotropic pitch was added to obtain a mixture containing 20% of the isotropic pitch. Thereafter, the mixture was subjected to a carbonization treatment at a temperature of 1100° C. and then to a pulverization treatment, thereby to manufacture spherical carbonaceous particles 15 μm in average particle diameter.

The true density of the carbonaceous particles was found to be 2.2 g/cm$^3$. The co-existance of graphite structure region and amorphous carbon structure region in the fine texture of the carbonaceous particles was confirmed from the (002) lattice image of an X-ray diffraction. When the diameter of fine pores existing in large number in the amorphous carbon region was measured by means of the small angle X-ray scattering method, the diameter of the pores was found to be 0.5 to 20 nm. These carbonaceous particles exhibited in the powder X-ray diffraction a peak corresponding to 0.3358 nm in $d_{002}$ and another peak corresponding to 0.380 nm in $d_{002}$. The peak corresponding to 0.3358 nm in $d_{002}$ was assumed to have been originated from the graphite structure region of the carbonaceous particles. On the other hand, the peak corresponding to 0.380 nm in $d_{002}$ was assumed to have been originated from the amorphous carbon structure region of the carbonaceous particles. When the spherical carbonaceous particles was observed using a SEM, the orientation of the graphite crystallites of the carbonaceous particles was found to be of random type. The particle having random type orientation means a particle not having a orientation of the graphite crystallites.

EXAMPLE 3

The same procedure as that of Example 1 was repeated to manufacture a cylindrical lithium secondary battery as shown in FIG. 1 except that a carbonaceous material as explained below was employed.

Phenol resin was added to mesophase pitch obtained from petroleum pitch to obtain a solution comprising 20% by volume of phenol resin. After having been spun and infusibilized, the resultant fibers was carbonized in an argon atmosphere at a temperature of 600° C. Then, the carbonized product was milled to obtain milled fibers 11 μm in average particle diameter and having a particle diameter distribution that not less than 90% of them being occupied by fibers having a particle diameter ranging from 1 to 80 μm and not more than 5% of them being occupied by fibers having a particle diameter of not more than 0.5 μm. Thereafter, the milled fibers were graphitized in an inert gas atmosphere at a temperature of 2,700° C. to manufacture milled carbon fibers.

The carbon fibers thus obtained were 7 μm in average diameter of fiber, 40 μm in average length and 20 μm in average particle diameter. The particle diameter distribution of the carbon fibers was such that not less than 90% by volume of them is occupied by fibers having a particle diameter ranging from 1 to 80 μm, fibers having a particle diameter of not more than 0.5 μm being 0% by volume. The specific surface area as measured by means of $N_2$ gas adsorption BET method was 1.2 $m^2/g$. The true density of carbon fibers was 2.0 $g/cm^3$. The co-existance of graphite structure region and amorphous carbon structure region in the fine texture of the carbon fibers was confirmed from the (002) lattice image of an X-ray diffraction. When the diameter of fine pores existing in large number in the amorphous carbon region was measured by means of the small angle X-ray scattering method, the diameter of the pores was found to be 0.5 to 20 nm. These carbon fibers exhibited in the powder X-ray diffraction a peak corresponding to 0.3357 nm in $d_{002}$. The peak corresponding to 0.3357 nm in $d_{002}$ was assumed to have been originated from the graphite structure region of the carbonaceous particles. When the cross-section of the carbon fibers was observed using a SEM, the orientation of the graphite crystallites of the carbon fibers was found to be of radiant type. There were some degree of disturbance in orientation.

EXAMPLE 4

The same procedure as that of Example 1 was repeated to manufacture a cylindrical lithium secondary battery as shown in FIG. 1 except that a carbonaceous material as explained below was employed.

Natural graphite was finely pulverized in such a manner to obtain particles having an average particle diameter of not more than 1 $\mu$m, to which isotropic pitch was added to obtain a mixture containing 20% of the isotropic pitch. Thereafter, the mixture was subjected to a carbonization treatment at a temperature of 1100° C. and then to a pulverization treatment, thereby to manufacture spherical carbonaceous particles 15 $\mu$m in average particle diameter.

The true density of the carbonaceous particles was found to be 2.2 g/cm3. The co-existance of graphite structure region and amorphous carbon structure region in the fine texture of the carbonaceous particles was confirmed from the (002) lattice image of an X-ray diffraction. When the diameter of fine pores existing in large number in the amorphous carbon region was measured by means of the small angle X-ray scattering method, the diameter of the pores was found to be 0.5 to 20 nm. These carbonaceous particles exhibited in the powder X-ray diffraction a peak corresponding to 0.3356 nm in $d_{002}$. The peak corresponding to 0.3356 nm in $d_{002}$ was assumed to have been originated from the graphite structure region of the carbonaceous particles. When the spherical carbonaceous particles was observed using a SEM, the orientation of the graphite crystallites of the carbonaceous particles was found to be of random type.

Comparative Example 1

The same procedure as that of Example 1 was repeated to manufacture a cylindrical lithium secondary battery as shown in FIG. 1 except that a carbonaceous material for a negative electrode as explained below was employed. Namely, an artificial graphite powder having a fine texture consisting only of graphite structure region, exhibiting a peak corresponding to 0.3354 nm in $d_{002}$ in the powder X-ray diffraction, having 100 nm or more in the length Lc in the direction of c-axis of crystallite as measured from the powder X-ray diffraction, and having a true density of 2.25 $g/cm^3$ was employed as the carbonaceous material.

Comparative Example 2

The same procedure as that of Example 1 was repeated to manufacture a cylindrical lithium secondary battery as shown in FIG. 1 except that a carbonaceous material for a negative electrode as explained below was employed. Namely, the carbonaceous material was prepared by subjecting epoxy novolak resin to a carbonization treatment at a temperature of 1,100° C.

The true density of the carbonaceous material was found to be 1.55 g/cm3. The co-existance of graphite structure region and amorphous carbon structure region in the fine texture of the carbonaceous material was confirmed from the (002) lattice image of an X-ray diffraction. When the diameter of fine pores existing in large number in the amorphous carbon region was measured by means of the small angle X-ray scattering method, the diameter of the pores was found to be 1 nm. This carbonaceous material exhibited in the powder X-ray diffraction a peak corresponding to 0.380 nm in $d_{002}$. The length Lc in the direction of c-axis of crystallite was found to be 1 nm as measured from the powder x-ray diffraction.

The secondary batteries obtained in Examples 1 to 4 and Comparative Examples 1 and 2 were subjected to a repetition of charge/discharge cycle wherein each battery was charged to a depth of 4.2V with a current of 1 A over a time period of 2.5 hours, and then discharged down to 2.7V with a current of 1 A. From this charge/discharge cycle test, the initial charge/discharge efficiency, a discharge capacity at the first cycle and the capacity retention ratio at the 300th cycle (in relative to the discharge capacity at the first cycle) of each battery were measured. The results are shown in Table 1 shown below.

|  | True density ($g/cm^3$) | $d00_2$ (nm) | Initial charge/discharge efficiency (%) | Discharge capacity (mAh) | Capacity retention ratio (300 cycles) (%) |
| --- | --- | --- | --- | --- | --- |
| Example 1 | 2.0 | 0.336 0.370 | 90 | 1800 | 90 |
| Example 2 | 2.2 | 0.3358 0.380 | 88 | 1700 | 85 |
| Example 3 | 2.21 | 0.3357 | 91 | 1950 | 90 |
| Example 4 | 2.22 | 0.3356 | 87 | 1750 | 90 |

-continued

|  | True density (g/cm³) | d00₂ (nm) | Initial charge/discharge efficiency (%) | Discharge capacity (mAh) | Capacity retention ratio (300 cycles) (%) |
|---|---|---|---|---|---|
| Comparative Example 1 | 2.25 | 0.3354 | 85 | 1300 | 70 |
| Comparative Example 2 | 1.55 | 0.380 | 75 | 1300 | 80 |

As apparent from Table 1, the secondary batteries according to Examples 1 to 4, each comprising a negative electrode containing a carbonaceous material having an amorphous carbon structure region and a graphite structure region, having a peak in powder X-ray diffraction which corresponds to not more than 0.340 nm in an interplanar spacing $d_{002}$ derived from (002) reflection and having a true density of 1.8 g/cm³ or more, were superior in the initial charge/discharge efficiency, in the discharge capacity as well as in the capacity retention ratio at the 300th cycle.

Whereas, the secondary battery according to Comparative Example 1 comprising a negative electrode containing a carbonaceous material whose fine texture is consisted only of a graphite structure region, having a peak in powder X-ray diffraction which corresponds to 0.3354 nm in $d_{002}$, was superior in the initial charge/discharge efficiency, but poor in the discharge capacity as well as in the capacity retention ratio as compared with Examples 1 to 4. On the other hand, the secondary battery according to Comparative Example 2, comprising a negative electrode containing a carbonaceous material having an amorphous carbon structure region and a graphite structure region, having a peak in powder X-ray diffraction which corresponds to 0.380 nm in $d_{002}$ and having a true density of 1.55 g/cm³, was poor in the initial charge/discharge efficiency, in the discharge capacity and in the capacity retention.

EXAMPLE 5

First of all, 91% by weight of lithium cobalt oxide powder LiCoO₂, 3.5% by weight of acetylene black, 3.5% by weight of graphite, and 2% by weight of ethylene-propylene-diene monomer powder were mixed together with toluene to obtain a mixture, which was then coated on an aluminum foil (30 μm) collector. The resultant aluminum foil collector was press-worked to obtain a positive electrode.

On the other hand, silicon carbide fine powder was added to mesophase pitch obtained from petroleum pitch and homogeneously dispersed therein. After having been spun and infusibilized, the fibers was carbonized in an inert gas atmosphere at a temperature of 600° C., and then, the carbonized product was milled so as to obtain milled fibers 15 μm in average particle diameter and having a particle diameter distribution that not less than 90% of them being occupied by fibers having a particle diameter ranging from 1 to 80 μm. Thereafter, the milled fibers were graphitized in a pressurized inert gas atmosphere at a temperature of 2,600° C. to manufacture milled carbon fibers.

The carbon fibers thus obtained contained 8% in atomic ratio of silicon (Si). The true density of carbon fibers was 2.1 g/cm³. These carbon fibers exhibited in the powder X-ray diffraction a peak corresponding to 0.3367 nm in $d_{002}$.

The carbon fibers was subjected to a powder X-ray diffraction using CuKα as an X-ray source and a high purity silicon as a standard material, and then, the length Lc in the c-axis of crystallite in the graphite structure region was calculated from the location and half-width value of a peak in a diffraction diagram thus obtained and by using a half-power band width mid-point method which is stipulated in the Method described in "Tanso" p25 (1963). As a result, the length Lc was found to be 35 nm. When the cross-section of the carbon fibers was observed using a SEM, the orientation of the graphite crystallites of the carbon fibers was found to be of radiant type. There were some degree of disturbance in orientation. The carbon fibers thus obtained indicated 7 μm in average diameter of fiber, 40 μm in average length and 20 μm in average particle diameter. The particle diameter distribution of the carbon fibers was such that not less than 90% by volume of them is occupied by fibers having a particle diameter ranging from 1 to 80 μm, fibers having a particle diameter of not more than 0.5 μm being 0% by volume. The specific surface area as measured by means of N₂ gas adsorption BET method was 1.2 m²/g.

Then, 96.7% by weight of the mesophase pitch based carbon fibers was mixed with 2.2% by weight of styrene/butadiene rubber and 1.1% by weight of carboxylmethyl cellulose to obtain a mixture, which was then coated on a copper foil to be employed as a collector. After being dried, the copper foil was pressed thereby obtaining a negative electrode. The packing density of the negative electrode thus obtained was 1.4 g/cm³.

The positive electrode, a separator composed of a polyethylene porous film and the negative electrode was stacked in this order, and then the resultant stacked body was spirally wound with the separator being disposed at the outermost side to obtain an electrode assembly.

Hexafluorolithium phosphate (LiPF₆) was dissolved in a mixed solvent consisting of ethylene carbonate (EC) and methylethyl carbonate (MEC) (volume ratio: 1:1) to obtain a non-aqueous electrolyte, the concentration of LiPF₆ being 1.0 mol/l (solvent).

Finally, the electrode assembly and the non-aqueous electrolyte were placed in a bottomed cylindrical case made of stainless steel, thereby fabricating a cylindrical lithium secondary battery as shown in FIG. 1.

EXAMPLE 6

The same procedure as that of Example 5 was repeated to manufacture a cylindrical lithium secondary battery as shown in FIG. 1 except that a carbonaceous material as explained below was employed.

Namely, the carbonaceous material was prepared as follows. Magnesium silicide (Mg₂Si) fine powder was added to mesophase pitch obtained from petroleum pitch and homogeneously dispersed therein. After having been spun and infusibilized, the fibers was carbonized in an inert gas atmosphere at a temperature of 600° C., and then, the carbonized product was milled so as to obtain milled fibers 15 μmin average particle diameter and having a particle diameter distribution that not less than 90% of them being occupied by fibers having a particle diameter ranging from 1 to 80 μm. Thereafter, the milled fibers were graphitized in a pressurized inert gas atmosphere at a temperature of 2,000° C. to manufacture milled carbon fibers.

The carbon fibers thus obtained contained 4% in atomic ratio of magnesium (Mg) and 2% in atomic ratio of silicon (Si). The true density of carbon fibers was 2.2 g/cm$^3$. The length Lc was found to be 25 nm. These carbon fibers exhibited in the powder X-ray diffraction a peak corresponding to 0.3380 nm in $d_{002}$.

When the cross-section of the carbon fibers was observed using a SEM, the orientation of the graphite crystallites of the carbon fibers was found to be of radiant type. There were some degree of disturbance in orientation. The carbon fibers thus obtained indicated 7 μm in average diameter of fiber, 40 μm in average length and 20 μm in average particle diameter. The particle diameter distribution of the carbon fibers was such that not less than 90% by volume of them is occupied by fibers having a particle diameter ranging from 1 to 80 μm, fibers having a particle diameter of not more than 0.5 μm being 0% by volume. The specific surface area as measured by means of $N_2$ gas adsorption BET method was 1.2 m$^2$/g.

EXAMPLE 7

The same procedure as that of Example 5 was repeated to manufacture a cylindrical lithium secondary battery as shown in FIG. 1 except that a carbonaceous material as explained below was employed.

Namely, the carbonaceous material was prepared as follows. Aluminum carbide ($Al_4C_3$) powder was added to mesophase pitch obtained from petroleum pitch. After having been spun and infusibilized, the fibers was carbonized in an inert gas atmosphere at a temperature of 600° C., and then, the carbonized product was milled so as to obtain milled fibers 15 μm in average particle diameter and having a particle diameter distribution that not less than 90% of them being occupied by fibers having a particle diameter ranging from 1 to 80 μm. Thereafter, the milled fibers were graphitized in a pressurized inert gas atmosphere at a temperature of 2,800° C. to manufacture milled carbon fibers.

The carbon fibers thus obtained contained 8% in atomic ratio of aluminum (Al). The true density of carbon fibers was 2.3 g/cm$^3$ and the length Lc was found to be 30 nm. These carbon fibers exhibited in the powder X-ray diffraction a peak corresponding to 0.3375 nm in $d_{002}$.

When the cross-section of the carbon fibers was observed using a SEM, the orientation of the graphite crystallites of the carbon fibers was found to be of radiant type. There were some degree of disturbance in orientation. The carbon fibers thus obtained indicated 7 μm in average diameter of fiber, 40 μm in average length and 20 μm in average particle diameter. The particle diameter distribution of the carbon fibers was such that not less than 90% by volume of them is occupied by fibers having a particle diameter ranging from 1 to 80 μm, fibers having a particle diameter of not more than 0.5 μm being 0% by volume. The specific surface area as measured by means of $N_2$ gas adsorption BET method was 1.2 m$^2$/g.

EXAMPLE 8

The same procedure as that of Example 5 was repeated to manufacture a cylindrical lithium secondary battery as shown in FIG. 1 except that a carbonaceous material as explained below was employed.

Namely, the carbonaceous material was prepared as follows. Tin oxalate fine powder was added to mesophase pitch obtained from petroleum pitch. After having been homogeneously dispersed, spun and infusibilized, the fibers was carbonized in an inert gas atmosphere at a temperature of 600° C., and then, the carbonized product was milled so as to obtain milled fibers 15 μm in average particle diameter and having a particle diameter distribution that not less than 90% of them being occupied by fibers having a particle diameter ranging from 1 to 80 μm. Thereafter, the milled fibers were graphitized in a pressurized inert gas atmosphere at a temperature of 2,000° C. to manufacture milled carbon fibers.

The carbon fibers thus obtained contained 5% in atomic ratio of tin (Sn). The true density of carbon fibers was 2.3 g/cm$^3$ and the length Lc was found to be 25 nm. These carbon fibers exhibited in the powder X-ray diffraction a peak corresponding to 0.3390 nm in $d_{002}$.

When the cross-section of the carbon fibers was observed using a SEM, the orientation of the graphite crystallites of the carbon fibers was found to be of radiant type. There were some degree of disturbance in orientation. The carbon fibers thus obtained indicated 7 μm in average diameter of fiber, 40 μm in average length and 20 μm in average particle diameter. The particle diameter distribution of the carbon fibers was such that not less than 90% by volume of them is occupied by fibers having a particle diameter ranging from 1 to 80 μm, fibers having a particle diameter of not more than 0.5 μm being 0% by volume. The specific surface area as measured by means of $N_2$ gas adsorption BET method was 1.2 m$^2$/g.

EXAMPLE 9

The same procedure as that of Example 5 was repeated to manufacture a cylindrical lithium secondary battery as shown in FIG. 1 except that a carbonaceous material as explained below was employed.

Namely, the carbonaceous material was prepared as follows. Calcium carbide ($CaC_3$) powder was added to mesophase pitch obtained from petroleum pitch. After having been spun and infusibilized, the dispersion was carbonized in an inert gas atmosphere at a temperature of 600° C., and then, the carbonized product was milled so as to obtain milled fibers 15 μm in average particle diameter and having a particle diameter distribution that not less than 90% of them being occupied by fibers having a particle diameter ranging from 1 to 80 μm. Thereafter, the milled fibers were graphitized in a pressurized inert gas atmosphere at a temperature of 2,000° C. to manufacture milled carbon fibers.

The carbon fibers thus obtained contained 9% in atomic ratio of calcium (Ca). The true density of carbon fibers was 2.25 g/cm$^3$ and the length Lc was found to be 35 nm. These carbon fibers exhibited in the powder X-ray diffraction a peak corresponding to 0.3370 nm in $d_{002}$.

When the cross-section of the carbon fibers was observed using a SEM, the orientation of the graphite crystallites of the carbon fibers was found to be of radiant type. There were some degree of disturbance in orientation. The carbon fibers thus obtained indicated 7 μm in average diameter of fiber, 40 μm in average length and 20 μm in average particle diameter. The particle diameter distribution of the carbon fibers was such that not less than 90% by volume of them is occupied by fibers having a particle diameter ranging from 1 to 80 μm, fibers having a particle diameter of not more than 0.5 μm being 0% by volume. The specific surface area as measured by means of $N_2$ gas adsorption BET method was 1.2 $m^2/g$.

EXAMPLE 10

The same procedure as that of Example 5 was repeated to manufacture a cylindrical lithium secondary battery as shown in FIG. 1 except that a carbonaceous material as explained below was employed.

Namely, the carbonaceous material was prepared as follows. Lead carbonate fine powder was added to mesophase pitch obtained from petroleum pitch. After having been homogeneously dispersed, spun and infusibilized, the fibers was carbonized in an inert gas atmosphere at a temperature of 600° C., and then, the carbonized product was milled so as to obtain milled fibers 15 $\mu$m in average particle diameter and having a particle diameter distribution that not less than 90% of them being occupied by fibers having a particle diameter ranging from 1 to 80 $\mu$m. Thereafter, the milled fibers were graphitized in a pressurized inert gas atmosphere at a temperature of 2,000° C. to manufacture milled carbon fibers.

The carbon fibers thus obtained contained 8% in atomic ratio of lead (Pb). The true density of carbon fibers was 2.5 $g/cm^3$ and the length Lc was found to be 35 nm. These carbon fibers exhibited in the powder X-ray diffraction a peak corresponding to 0.3370 nm in $d_{002}$.

When the cross-section of the carbon fibers was observed using a SEM, the orientation of the graphite crystallites of the carbon fibers was found to be of radiant type. There were some degree of disturbance in orientation. The carbon fibers thus obtained indicated 7 $\mu$m in average diameter of fiber, 40 $\mu$m in average length and 20 $\mu$m in average particle diameter. The particle diameter distribution of the carbon fibers was such that not less than 90% by volume of them is occupied by fibers having a particle diameter ranging from 1 to 80 $\mu$m, fibers having a particle diameter of not more than 0.5 $\mu$m being 0% by volume. The specific surface area as measured by means of $N_2$ gas adsorption BET method was 1.2 $m^2/g$.

EXAMPLE 11

The same procedure as that of Example 5 was repeated to manufacture a cylindrical lithium secondary battery as shown in FIG. 1 except that a carbonaceous material as explained below was employed.

Namely, the carbonaceous material was prepared as follows. Silicon carbide fine powder and aluminum carbide were added to mesophase pitch obtained from petroleum pitch. After having been homogeneously dispersed, spun and infusibilized, the fibers was carbonized in an inert gas atmosphere at a temperature of 600° C., and then, the carbonized product was milled so as to obtain milled fibers 15 $\mu$m in average particle diameter and having a particle diameter distribution that not less than 90% of them being occupied by fibers having a particle diameter ranging from 1 to 80 $\mu$m. Thereafter, the milled fibers were graphitized in a pressurized inert gas atmosphere at a temperature of 2,000° C. to manufacture milled carbon fibers.

The carbon fibers thus obtained contained 10% in atomic ratio of silicon (Si) and 10% in atomic ratio of aluminum (Al). The true density of carbon fibers was 2.2 $g/cm^3$ and the length Lc was found to be 35 nm. These carbon fibers exhibited in the powder X-ray diffraction a peak corresponding to 0.3370 nm in $d_{002}$.

When the cross-section of the carbon fibers was observed using a SEM, the orientation of the graphite crystallites of the carbon fibers was found to be of radiant type. There were some degree of disturbance in orientation. The carbon fibers thus obtained indicated 7 $\mu$m in average diameter of fiber, 40 $\mu$m in average length and 20 $\mu$m in average particle diameter. The particle diameter distribution of the carbon fibers was such that not less than 90% by volume of them is occupied by fibers having a particle diameter ranging from 1 to 80 $\mu$m, fibers having a particle diameter of not more than 0.5 $\mu$m being 0% by volume. The specific surface area as measured by means of $N_2$ gas adsorption BET method was 1.2 $m^2/g$.

Comparative Example 3

The same procedure as that of Example 5 was repeated to manufacture a cylindrical lithium secondary battery as shown in FIG. 1 except that a carbonaceous material as explained below was employed.

Namely, the carbonaceous material was prepared as follows. Mesophase pitch obtained from petroleum pitch was spun and infusibilized at first and then, carbonized in an inert gas atmosphere at a temperature of 600° C. The carbonized product was milled so as to obtain milled fibers 15 $\mu$m in average particle diameter and having a particle diameter distribution that not less than 90% of them being occupied by fibers having a particle diameter ranging from 1 to 80 $\mu$m. Thereafter, the fibers were graphitized in a pressurized inert gas atmosphere at a temperature of 2,600° C. to manufacture milled carbon fibers.

The carbon fibers thus obtained was free from any of the element M. The true density of carbon fibers was 2.2 $g/cm^3$ and the length Lc was found to be 35 nm. These carbonaceous particles exhibited in the powder X-ray diffraction a peak corresponding to 0.3375 nm in $d_{002}$.

When the cross-section of the carbon fibers was observed using a SEM, the orientation of the graphite crystallites of the carbon fibers was found to be of radiant type. There were some degree of disturbance in orientation. The carbon fibers thus obtained indicated 7 $\mu$m in average diameter of fiber, 40 $\mu$m in average length and 20 $\mu$m in average particle diameter. The particle diameter distribution of the carbon fibers was such that not less than 90% by volume of them is occupied by fibers having a particle diameter ranging from 1 to 80 $\mu$m, fibers having a particle diameter of not more than 0.5 $\mu$m being 0% by volume. The specific surface area as measured by means of $N_2$ gas adsorption BET method was 1.2 $m^2/g$.

Comparative Example 4

The same procedure as that of Example 5 was repeated to manufacture a cylindrical lithium secondary battery as shown in FIG. 1 except that a carbonaceous material for a negative electrode as explained below was employed. Namely, novolak resin was subjected to a carbonization treatment at a temperature of 1,100° C. to obtain a carbonaceous material having a true density of 1.6 $g/cm^3$, exhibiting a peak corresponding to 0.380 nm in $d_{002}$ in the powder X-ray diffraction, and having 1 nm in the length Lc as measured from the powder X-ray diffraction.

Comparative Example 5

The same procedure as that of Example 5 was repeated to manufacture a cylindrical lithium secondary battery as shown in FIG. 1 except that a carbonaceous material for a negative electrode as explained below was employed. Namely, a vapor-phase growth carbon body having a true density of 1.7 $g/cm^{31}$ exhibiting a peak corresponding to 0.349 nm in $d_{002}$ in the powder X-ray diffraction, and having 2.5 nm in the length Lc as measured from the powder X-ray diffraction was employed as the carbonaceous material.

Comparative Example 6

The same procedure as that of Example 5 was repeated to manufacture a cylindrical lithium secondary battery as shown in FIG. 1 except that a negative electrode was a lithium alloy consisting of lithium aluminum (LiAl).

The secondary batteries obtained in Examples 5 to 11 and Comparative Examples 3 to 6 were subjected to a repetition of charge/discharge cycle wherein each battery was charged to a depth of 4.2V with a current of 1.5 A over a time period of 2 hours, and then discharged down to 2.7V with a current of 1.5 A. From this charge/discharge cycle test, a discharge capacity at the first cycle and the capacity retention ratio at the $500^{th}$ cycle (in relative to the discharge capacity at the first cycle) of each battery were measured. The results are shown in Table 2 shown below.

TABLE 2

| | Element M | $d_{002}$ (nm) | Discharge capacity (mAh) | Capacity retention ratio (%) |
|---|---|---|---|---|
| Example 5 | Si | 0.3367 | 1700 | 86 |
| Example 6 | Mg.Si | 0.3380 | 1750 | 88 |
| Example 7 | Al | 0.3375 | 1800 | 86 |
| Example 8 | Sn | 0.3390 | 1650 | 89 |
| Example 9 | Ca | 0.3370 | 1700 | 87 |
| Example 10 | Pb | 0.3370 | 1700 | 85 |
| Example 11 | Si.Al | 0.3380 | 1750 | 84 |
| Comparative Example 3 | — | 0.3375 | 1400 | 70 |
| Comparative Example 4 | — | 0.380 | 1300 | 75 |
| Comparative Example 5 | Si | 0.349 | 1000 | 80 |
| Comparative Example 6 | — | — | 2000 | 10 |

As apparent from Table 2, the secondary batteries according to Examples 5 to 11, each comprising a negative electrode comprising a carbonaceous material containing at least one kind of elements M selected from the group consisting of Mg, Al, Si, Ca, Sn and Pb, and having a peak in powder X-ray diffraction which corresponds to not more than 0.344 nm in an interplanar spacing $d_{002}$ derived from (002) reflection, were superior in the discharge capacity as well as in the capacity retention ratio at the 500th cycle.

Whereas, the secondary batteries according to Comparative Example 3 comprising a negative electrode comprising a carbonaceous material having a peak in powder X-ray diffraction which corresponds to not more than 0.344 nm in $d_{002}$ but containing none of the element M, according to Comparative Example 4 comprising a negative electrode containing a carbonaceous material having a peak in powder X-ray diffraction which corresponds to 0.380 nm in $d_{002}$, and according to Comparative Example 5 comprising a negative electrode comprising a carbonaceous material containing Si but having a peak in powder X-ray diffraction which corresponds to 0.349 nm in $d_{002}$ were inferior in the discharge capacity as well as in the capacity retention ratio as compared with Examples 5 to 11. On the other hand, the secondary batteries according to Comparative Example 6 comprising a negative electrode formed of a lithium alloy was superior in discharge capacity as compared with Examples 5 to 11, but was very poor in the capacity retention at the 500th cycle.

As explained above, it is possible according to this invention to provide a lithium secondary battery which is improved in the initial charge/discharge efficiency, discharge capacity and cycle life.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A lithium secondary battery comprising a positive electrode, a negative electrode comprising a carbonaceous material which is capable of absorbing and desorbing lithium ions, and a nonaqueous electrolyte;

wherein said carbonaceous material comprises a combination M of Si and Al, or of Ca and Mg, or of Si and Mg, and has a peak in powder X-ray diffraction which corresponds to not more than 0.344 nm in an interplanar spacing $d_{002}$ derived from (002) reflection.

2. A second battery according to claim 1, wherein a content of the combination M in said carbonaceous material is 0.1 to 10% in atomic ratio.

3. A secondary battery according to claim 2, wherein said carbonaceous material has a true density of 1.7 g/cm$^3$ or more.

4. A secondary battery according to claim 2, wherein said carbonaceous material has a peak in powder X-ray diffraction which corresponds to 0.3354 to 0.344 nm in an interplanar spacing $d_{002}$ derived from (002) reflection.

5. A secondary battery according to claim 2, wherein said carbonaceous material is fibrous or spherical in shape.

6. A secondary battery according to claim 5, wherein an orientation of graphite crystallites of said carbon fibers is radiant.

7. A secondary battery according to claim 5, wherein an orientation of graphite crystallites of said spherical carbonaceous particles is radiant.

8. A secondary battery according to claim 2, wherein said positive electrode contains at least one oxide selected from the group consisting of lithium-manganese composite oxide, lithium-containing nickel oxide, lithium-containing cobalt oxide and lithium-containing nickel cobalt oxide.

9. A secondary batter according to claim 1, wherein said carbonaceous material has a true density of 1.7 g/cm$^3$ or more.

10. A secondary battery according to claim 1, wherein said carbonaceous material has a peak in powder X-ray diffraction which corresponds to 0.3354 to 0.344 nm in an interplanar spacing $d_{002}$ derived from (002) reflection.

11. A secondary battery according to claim 1, wherein said carbonaceous material is fibrous or spherical in shape.

12. A secondary battery according to claim 11, wherein an orientation of graphite crystallites of said carbonaceous fibers is radiant.

13. A secondary battery according to claim 11, wherein an orientation of graphite crystallites of said spherical carbonaceous particles is radiant.

14. A secondary battery according to claim 1, wherein said positive electrode contains at least one oxide selected from the group consisting of lithium-manganese composite oxide, lithium-containing nickel oxide, lithium-containing cobalt oxide and lithium-containing nickel cobalt oxide.

15. A secondary battery according to claim 1, wherein said nonaqueous electrolyte contains ethylene carbonate and at least one nonaqueous solvent whose melting point is lower than that of aforementioned ethylene carbonate and whose donor number is 18 or less and an electrolytic salt.

16. A secondary battery according to claim 15, wherein said nonaqueous solvent comprises at least one solvent selected from the group consisting of propylene carbonate, dimethyl carbonate, ethylmethyl carbonate and γ-butyrolactone.

17. A secondary battery according to claim 1, wherein said positive electrode contains lithium cobalt oxide, lithium nickel oxide or lithium manganese oxide.

18. A secondary battery according to claim 1, wherein a content of the combination M in said carbonaceous 1 to 8% in atomic ratio.

19. The secondary battery according to claim 1, wherein said carbonaceous material further comprises B.

20. A lithium secondary battery, comprising:
a positive electrode;
a negative electrode containing at least one carbonaceous material selected from the group consisting of a fibrous carbonaceous material absorbing and desorbing lithium ions and spherical carbonaceous material particles absorbing and desorbing lithium ions and having a ratio of the shorter diameter to the longer diameter of at least 1/10; and
a nonaqueous electrolyte;
wherein said fibrous carbonaceous material and said spherical carbonaceous material particles contain at least one element M selected from the group consisting of Mg, Al, Si, Ca, Sn and Pb, and
wherein each of said fibrous carbonaceous material and said spherical carbonaceous material particles has a peak in powder X-ray diffraction, which peak corresponds to an interplanar $d_{002}$ spacing derived from (002) reflection of 0.3354 nm to less than 0.3370 nm.

21. The secondary battery according to claim 20, wherein each of said fibrous carbonaceous material and said spherical carbonaceous material particles has a true density of at least 1.7 g/cm$^3$.

22. The secondary battery according to claim 20, wherein each of said fibrous carbonaceous material and said spherical carbonaceous material particles contains said element M is an atomic ratio of 0.1 to 10%.

23. The secondary battery according to claim 20, wherein an aspect ratio denoting the ratio of the length to the diameter of said fibrous carbonaceous material is 2 to 10.

24. The secondary battery according to claim 20, wherein said fibrous carbonaceous material has an average particle diameter of 1 to 100 μm.

25. The secondary battery according to claim 20, wherein said fibrous carbonaceous material has an average fiber length of 10 to 100 μm.

26. The secondary battery according to claim 20, wherein said fibrous carbonaceous material has an average diameter of 1 to 20 μm.

27. The secondary battery according to claim 20, wherein said fibrous carbonaceous material is carbonized or graphitized.

28. The secondary battery according to claim 20, wherein said spherical carbonaceous material particle has a ratio of the shorter diameter to the longer diameter of at least 1/2.

29. The secondary battery according to claim 20, wherein said spherical carbonaceous material particle has an average particle diameter of 1 to 100 μm.

30. The secondary battery according to claim 20, wherein said spherical carbonaceous material particle is carbonized or graphitized.

31. The secondary battery according to claim 20, wherein said nonaqueous electrolyte contains ethylene carbonate, at least one nonaqueous solvent whose melting point is lower than that of said ethylene carbonate and whose donor number is 18 or less, and an electrolytic salt.

32. The secondary battery according to claim 31, wherein said nonaqueous solvent comprises at least one solvent selected from the group consisting of propylene carbonate, dimethyl carbonate, ethylmethyl carbonate and γ-butyrolactone.

33. The secondary battery according to claim 20, wherein each of said fibrous carbonaceous material and said spherical carbonaceous material particle further comprises B.

34. The secondary battery according to claim 20, wherein said fibrous carbonaceous material is a graphitized mesophase pitch based carbon fiber, and said spherical carbonaceous material particles are graphitized mesophase globules, and wherein each of said graphitized mesophase pitch based carbon fiber and said graphitized mesophase globules contains at least one element M selected from the group consisting of Mg, Al, Si, Ca, Sn and Pb, and has a peak in powder X-ray diffraction, which corresponds to an interplanar $d_{002}$ spacing derived from (002) reflection of 0.3354 nm to less than 0.3370 nm.

35. The secondary battery according to claim 20, wherein said peak corresponds to an interplanar $d_{002}$ spacing of 0.3354 to 0.3376 nm.

36. A lithium secondary battery, comprising:
a positive electrode;
a negative electrode comprising a carbonaceous material which is capable of absorbing and desorbing lithium ions; and
a nonaqueous electrolyte;
wherein said carbonaceous material comprises a combination M of Si and Al, or of Ca and Mg, or of Si and Mg.

37. The secondary battery according to claim 36, wherein said carbonaceous material has a peak in powder X-ray diffraction which corresponds to not more than 0.344 nm in an interplanar spacing $d_{002}$ derived from (022) reflection.

38. The secondary battery according to claim 36, wherein said carbonaceous material has a true density of 1.7 g/cm$^3$ or more.

39. The secondary battery according to claim 36, wherein said carbonaceous material is fibrous or spherical in shape, said spherical carbonaceous material having a ratio of the shorter diameter to the longer diameter of at least 1/10.

40. The secondary battery according to claim 36, wherein said carbonaceous material further comprises B.

41. A lithium secondary battery comprising:
a positive electrode;
a negative electrode containing a carbonaceous material which is capable of absorbing and desorbing lithium ions; and
a nonaqueous electrolyte;
wherein said carbonaceous material comprises at least one element M selected from the group consisting of Mg, Al, Si, Ca, Sn and Pb, and has a peak in powder X-ray diffraction, which peak corresponds to an interplanar $d_{002}$ spacing derived from (002) reflection of 0.3354 nm to less than 0.3370 nm.

42. The secondary battery according to claim 41, wherein said element M is Si.

43. The secondary battery according to claim 41, wherein a true density of said carbonaceous material is 1.7 g/cm$^3$ or more.

44. The secondary battery according to claim 41, wherein said element M is present in said carbonaceous material at an atomic ratio of 0.1 to 10%.

45. The secondary battery according to claim 41, wherein said nonaqueous electrolyte comprises ethylene carbonate and at least one nonaqueous solvent whose melting point is lower than that of said ethylene carbonate and whose donor number is 18 or less.

46. The secondary battery according to claim 45, wherein said nonaqueous solvent comprises at least one solvent selected from the group consisting of propylene carbonate, dimethyl carbonate, ethylmethyl carbonate, diethyl carbonate, and γ-butyrolactone.

47. The secondary battery according to claim 41, wherein said carbonaceous material further contains B.

48. The secondary battery according to claim 41, wherein said carbonaceous material is a graphitized mesophase pitch, which comprises at least one element M selected from the group consisting of Mg, Al, Si, Ca, Sn and Pb, and which has a peak in powder X-ray diffraction which corresponds to an interplanar $d_{002}$ spacing derived from (002) reflection of 0.3354 nm to less than 0.3370 nm.

49. The secondary battery according to claim 41, wherein said peak corresponds to an interplanar $d_{002}$ spacing of 0.3354 to 0.3376 nm.

* * * * *